US006983686B2

(12) United States Patent
Vaughn et al.

(10) Patent No.: US 6,983,686 B2
(45) Date of Patent: Jan. 10, 2006

(54) PROCESS FOR PRODUCING HIGHLY REGISTERED PRINTED IMAGES AND EMBOSSMENT PATTERNS ON STRETCHABLE SUBSTRATES

(75) Inventors: Jeffrey Moss Vaughn, Cincinnati, OH (US); Kathleen Ann Murphy Maciag, Cincinnati, OH (US); Fredrick Edward Lockwood, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 10/874,866

(22) Filed: Jun. 23, 2004

(65) Prior Publication Data

US 2004/0261639 A1 Dec. 30, 2004

Related U.S. Application Data

(60) Provisional application No. 60/480,714, filed on Jun. 23, 2003.

(51) Int. Cl.
*B31F 1/07* (2006.01)
*B31F 1/20* (2006.01)
*B41F 13/56* (2006.01)
*B32B 31/00* (2006.01)

(52) U.S. Cl. ........................ 101/32; 101/226; 101/227; 156/209; 156/64

(58) Field of Classification Search .................. 101/32, 101/207, 248, 152, 28, 6, 491, 490, 181, 101/483, 227; 428/156; 156/209, 384
See application file for complete search history.

(56) References Cited

U.S. PATENT DOCUMENTS 680,533 A 8/1901 Marinier et al. .............. 101/23
690,822 A 1/1902 Avril ........................... 101/23

(Continued)

FOREIGN PATENT DOCUMENTS

CA 1143614 3/1983

(Continued)

OTHER PUBLICATIONS

Packaging Materials Purchase, Gearless Printing: A Revolutionary Concept, Mar.-Apr. 2002, www.indianpurchase.com/magonline/packaging/2002/04/article3.htm.

(Continued)

*Primary Examiner*—Ren Yan
*Assistant Examiner*—Wasseem H. Hamdan
(74) *Attorney, Agent, or Firm*—Stephen T. Murphy; David M. Weirich; Ken K. Patel

(57) ABSTRACT

A process for making continuous stretchable substrate products comprising the steps of supplying a web of stretchable substrate having a first surface and a second surface, embossing at least one of the surfaces of the web substrate with an embossed image using at least one embossing roller, printing at least one of the surfaces of the web substrate with a printed image using at least one printing roller; wherein the embossed image and the printed image are disposed onto the substrate relative to each other such that a print/emboss registration is created, measuring the angular location of one embossing roller and translating that location into a digital signal, measuring the angular location of one printing roller and translating that location into a digital signal, manually zeroing the print/emboss registration; and automatically controlling the print and emboss rolls to maintain registration using a control program that comprises the steps of i) comparing the digital signal from the embossing roller and the digital signal from the printing roller, and ii) correcting the angular location and angular speed of either the embossing roller or the printing roller.

5 Claims, 3 Drawing Sheets

U.S. PATENT DOCUMENTS

| | | | | | |
|---|---|---|---|---|---|
| 1,716,237 | A | | 6/1929 | Molins | 101/157 |
| 2,054,313 | A | | 9/1936 | Bright | 101/23 |
| 2,667,426 | A | | 1/1954 | Davis | 264/129 |
| 2,681,612 | A | | 6/1954 | Reimann | 101/25 |
| 2,746,387 | A | | 5/1956 | Neumann | 101/155 |
| 2,858,232 | A | | 10/1958 | Hushebeck et al. | 428/187 |
| 3,024,154 | A | * | 3/1962 | Singleton et al. | 156/209 |
| 3,097,844 | A | * | 7/1963 | Huck | 270/52.08 |
| 3,414,459 | A | | 12/1968 | Wells | 428/180 |
| 3,573,136 | A | | 3/1971 | Gardner | 156/384 |
| 3,594,552 | A | | 7/1971 | Adamson et al. | 377/18 |
| 3,681,159 | A | * | 8/1972 | Portnoy et al. | 156/209 |
| 3,840,421 | A | * | 10/1974 | Peterson | 156/384 |
| 3,867,225 | A | * | 2/1975 | Nystrand | 156/209 |
| 3,945,870 | A | * | 3/1976 | Johnsen | 156/201 |
| 4,135,024 | A | | 1/1979 | Callahan et al. | 428/171 |
| 4,177,730 | A | | 12/1979 | Schriber et al. | 101/248 |
| 4,423,676 | A | * | 1/1984 | Neel | 101/211 |
| 4,444,103 | A | | 4/1984 | Cronin | 101/93.13 |
| 4,495,582 | A | | 1/1985 | Dessert et al. | 700/124 |
| 4,512,256 | A | | 4/1985 | Schriber et al. | 101/248 |
| 4,541,333 | A | | 9/1985 | Sillars | 101/76 |
| 4,549,917 | A | | 10/1985 | Jensen, Jr. | 156/108 |
| 4,617,080 | A | | 10/1986 | Kobayashi et al. | 156/359 |
| 4,683,704 | A | | 8/1987 | Vorachek et al. | 53/461 |
| 4,732,082 | A | * | 3/1988 | Ireton | 101/23 |
| 4,751,879 | A | | 6/1988 | Van Pelt | 101/228 |
| 4,795,513 | A | | 1/1989 | Jensen, Jr. | 156/108 |
| 5,000,727 | A | | 3/1991 | Hatchell et al. | 493/193 |
| 5,062,360 | A | * | 11/1991 | Germann et al. | 101/152 |
| 5,066,352 | A | * | 11/1991 | Albers et al. | 156/265 |
| 5,117,753 | A | | 6/1992 | Mamberer | 101/225 |
| 5,123,343 | A | * | 6/1992 | Willer | 101/23 |
| 5,294,475 | A | | 3/1994 | McNeil | 428/154 |
| 5,339,730 | A | * | 8/1994 | Ruppel et al. | 101/32 |
| 5,449,200 | A | | 9/1995 | Andric et al. | 283/67 |
| 5,468,323 | A | | 11/1995 | McNeil | 156/209 |
| 5,488,480 | A | | 1/1996 | Saindon et al. | 356/429 |
| 5,518,559 | A | | 5/1996 | Saindon et al. | 156/64 |
| 5,530,323 | A | | 6/1996 | Breitzmann | 318/85 |
| 5,587,032 | A | | 12/1996 | Saindon et al. | 156/64 |
| 5,622,106 | A | | 4/1997 | Rayner | 101/32 |
| 5,637,194 | A | * | 6/1997 | Ampulski et al. | 162/109 |
| 5,641,563 | A | | 6/1997 | Truong et al. | 442/327 |
| 5,656,333 | A | | 8/1997 | Truong et al. | 427/243 |
| 5,660,674 | A | | 8/1997 | Saindon et al. | 156/353 |
| 5,701,180 | A | | 12/1997 | Saindon et al. | 356/429 |
| 5,711,225 | A | * | 1/1998 | Rasmussen | 101/483 |
| 5,724,891 | A | * | 3/1998 | Lovison | 101/490 |
| 5,743,184 | A | | 4/1998 | Skudrzyk | 101/181 |
| 5,802,974 | A | | 9/1998 | McNeil | 101/226 |
| 5,802,979 | A | * | 9/1998 | Lovison | 101/491 |
| 5,861,078 | A | | 1/1999 | Huben et al. | 156/353 |
| 5,940,105 | A | * | 8/1999 | Hayami | 347/104 |
| 5,964,151 | A | * | 10/1999 | Mathea | 101/227 |
| 6,030,690 | A | | 2/2000 | McNeil et al. | 428/156 |
| 6,047,642 | A | * | 4/2000 | Hunkeler | 101/483 |
| 6,050,061 | A | | 4/2000 | Todd et al. | 53/455 |
| 6,086,715 | A | | 7/2000 | McNeil | 162/132 |
| 6,113,723 | A | | 9/2000 | McNeil et al. | 156/209 |
| 6,129,972 | A | | 10/2000 | McNeil et al. | 428/154 |
| 6,142,407 | A | | 11/2000 | McNeil et al. | 242/533.6 |
| 6,164,200 | A | * | 12/2000 | Mathea | 101/227 |
| 6,183,671 | B1 | | 2/2001 | Stauffacher et al. | 264/40.1 |
| 6,195,967 | B1 | | 3/2001 | Todd et al. | 53/562 |
| 6,247,293 | B1 | | 6/2001 | Todd et al. | 53/562 |
| 6,272,815 | B1 | | 8/2001 | Todd et al. | 53/562 |
| 6,272,982 | B1 | * | 8/2001 | Stauffacher et al. | 101/6 |
| 6,277,466 | B1 | | 8/2001 | McNeil et al. | 428/154 |
| 6,395,133 | B1 | | 5/2002 | McNeil | 162/132 |
| 6,475,128 | B1 | | 11/2002 | Wallace et al. | 493/8 |
| 6,564,710 | B1 | * | 5/2003 | Mathea | 101/227 |
| 2002/0048662 | A1 | | 4/2002 | Bredahl et al. | 425/195.1 |

FOREIGN PATENT DOCUMENTS

| | | | | |
|---|---|---|---|---|
| CA | 1173136 | | | 8/1984 |
| EP | 1 304 215 | A1 | | 10/2001 |
| GB | 2 359 300 | | * | 8/2001 |
| GB | 2 359 300 | A | | 8/2001 |
| NL | 1000305 | | | 11/1996 |

OTHER PUBLICATIONS

Andrew Mykytiuk, Examining Trends In Drives And Motors, Paper, Film, Foil, Jan. 1996, www.convertingloop.com/cgi-bin/cl.pl/db area/converting/paper film foil/1996/pffc01.

* cited by examiner

PROCESS FOR PRODUCING HIGHLY REGISTERED PRINTED IMAGES AND EMBOSSMENT PATTERNS ON STRETCHABLE SUBSTRATES

CROSS REFERENCE TO RELATED APPLICATIONS

This application claims the benefit of U.S. Provisional Application No. 60/480,714, filed Jun. 23, 2003.

FIELD OF THE INVENTION

This invention relates to continuous stretchable substrate products having highly registered printed images and embossment patterns.

BACKGROUND OF THE INVENTION

The desire to improve the aesthetic characteristics of sheet-type or web-type consumer products by both embossing and printing the product is very old. (See U.S. Pat. No. 680,533 issued to Marinier et al. on Aug. 13, 1901.) Of course, much technical development has occurred in these fields in subsequent years. However, there has remained a difficulty of obtaining registered print and embossed images on stretchable substrates due to the fact that the printing process is generally a 2-dimensional application of ink or other substance onto the surface of the web of sheet product and the embossing process is generally a 3-dimensional, deformation of the sheet or web. The 3-dimensional deformation of the web results in a change in the physical dimensions, of length and width, of the web. Therefore, the printing image and the embossed image are disposed onto the substrate at different relative location on the web. This results in a misregistration of the two images which has led to a reluctance by manufacturers to produce products with highly registered print and emboss graphics.

This problem is compounded on manufacturing lines which process continuous webs of product substrate. The printing and embossing of continuous webs generally utilize rotary cylinder print and emboss rolls. Very often these rolls are on units manufactured by different companies and have different physical dimensions and drive mechanisms. Additional deviations in register can develop if the thickness, moisture content, or other parameter which impacts the stretch characteristics of the substrate change during the production run. An uncorrected process will compound the misregistration with each revolution, resulting in a "creep" of one image away from its desired position with respect to the other image.

Even print and emboss processes that utilize a single carrier/impression roller upon which the substrate is supported while being printed and embosses, as represented in European Patent Application EP 1 304 215, does not account for the change in the substrate dimensions to achieve a highly registered result.

Applicants have developed a process which automatically coordinates the actual application of the print and emboss images by the respective applicator rolls such that the print and emboss images remain in a highly registered state throughout the production of the web product.

SUMMARY OF THE INVENTION

The present invention relates to a process for making continuous stretchable substrate products comprising the steps of:

a) supplying a web of stretchable substrate having a first surface and a second surface;

b) embossing at least one of the surfaces of the web substrate with an embossed image using at least one embossing roller;

c) printing at least one of the surfaces of the web substrate with a printed image using at least one printing roller; wherein the embossed image and the printed image are disposed onto the substrate relative to each other such that a print/emboss registration is created;

d) measuring the angular location of one embossing roller and translating that location into a digital signal;

e) measuring the angular location of one printing roller and translating that location into a digital signal;

f) manually zeroing the print/emboss registration; and g) automatically controlling the print and emboss rolls to maintain registration using a control program that comprises the steps of:

i) comparing the digital signal from the embossing roller and the digital signal from the printing roller; and ii) correcting the angular location and angular speed of either the embossing roller or the printing roller.

BRIEF DESCRIPTION OF THE DRAWINGS

While the specification concludes with claims which particularly point out and distinctly claim the present invention, it is believed that the present invention will be better understood from the following description of preferred embodiments, taken in conjunction with the accompanying drawings, in which like reference numerals identify identical elements and wherein:

DETAILED DESCRIPTION OF THE INVENTION

Figure 1:
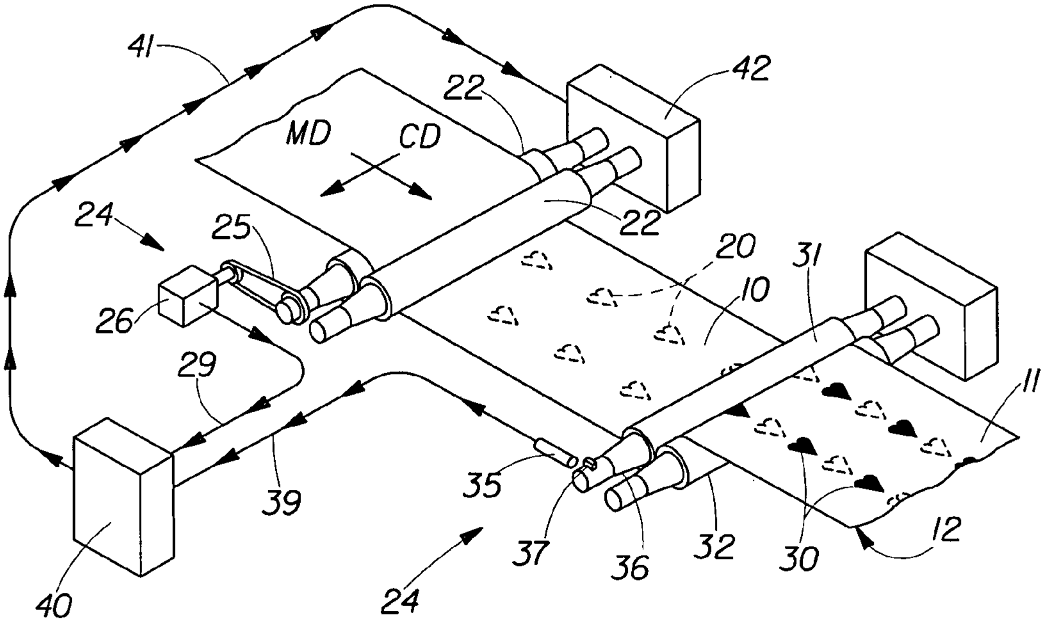
FIG. 1 is a schematic illustration of the process according to the present invention.
Figure 2:
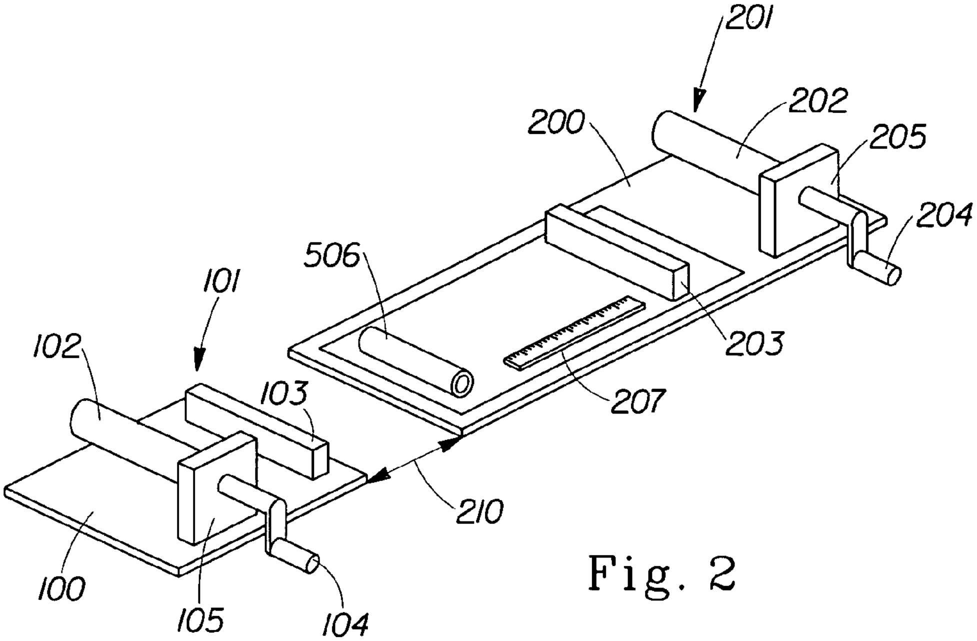
FIG. 2 is an overhead view illustration of the testing tables used in the MD Registration Margin of Error test method.
Figure 3A:
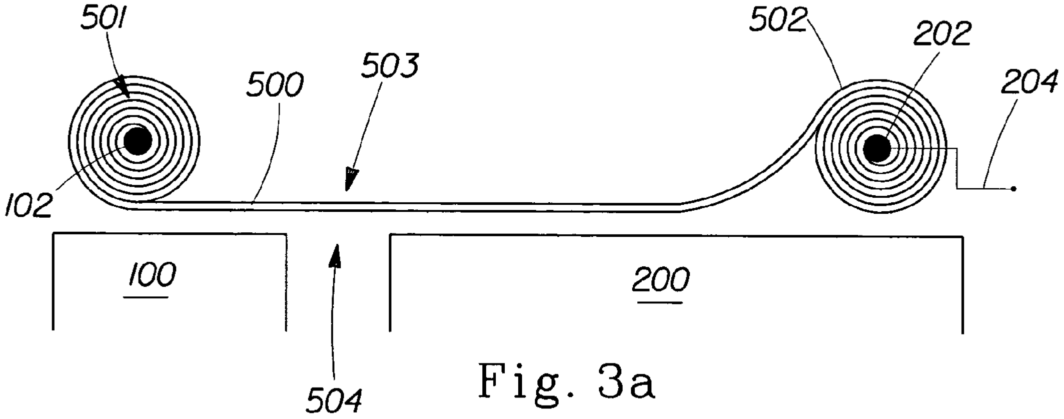
FIG. 3*a* is a side view illustration of the web path configuration for rewinding the sample log in the MD Registration Margin of Error test method.
Figure 3B:
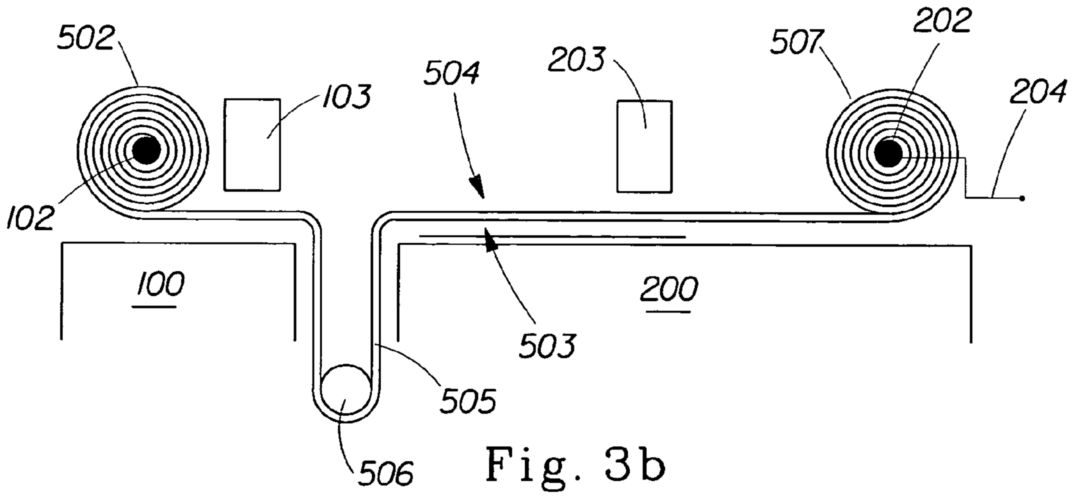
FIG. 3*b* is a side view illustration of the web path configuration for measuring the print-to-emboss registration in the MD Registration Margin of Error test method.
Figure 4:
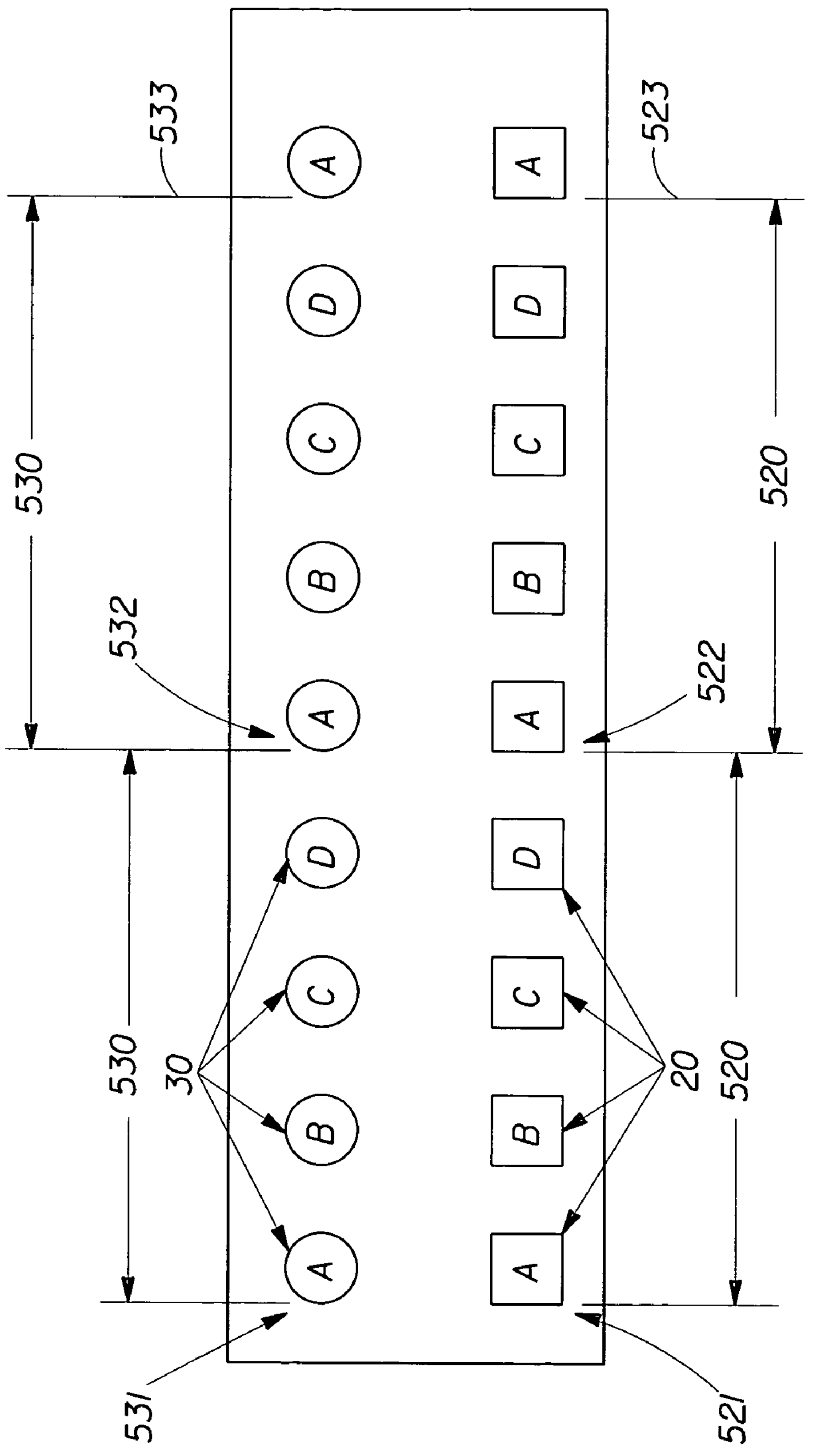
FIG. 4 is a schematic illustration of the sample sheet showing the relationship of repeating patterns of embossed patterns and repeating patterns of printed patterns.

The present invention relates to processes for making continuous stretchable substrate products comprising the steps of supplying a web of stretchable substrate having a first surface and a second surface, embossing at least one of the surfaces of the web substrate with an embossed image using at least one embossing roller, printing at least one of the surfaces of the web substrate with a printed image using at least one printing roller; wherein the embossed image and the printed image are disposed onto the substrate relative to each other such that a print/emboss registration is created, measuring the angular location of one embossing roller and translating that location into a digital signal, measuring the angular location of one printing roller and translating that location into a digital signal, manually zeroing the print/emboss registration; and automatically controlling the print and emboss rolls to maintain registration using a control program that comprises the steps of i) comparing the digital signal from the embossing roller and the digital signal from the printing roller, and ii) correcting the angular location and angular speed of either the embossing roller or the printing roller.

As used herein, "continuous" means a relatively very long product produced in a mostly continuous manufacturing process. A preferred example of a continuous product for use in the present process is rolled substrate where the length of the substrate on the roll is very long in relation to its width. The roll has a fixed length but becomes substantially continuous by splicing the webs together to allow the process to run for much longer lengths of time.

As used herein, "web" refers to any thin, permeable or impermeable substrate to be printed on. A web is characterized in being much longer in the machine direction than in the cross direction and is generally handled in rolls of substrate. The web has two surfaces, a first or top surface and a second or back surface as processed through the equipment.

As used herein, the phrase "stretchable substrate" refers to any material, including, but not limited to paper, polymeric or plastic films, cloths or fabrics, wovens, nonwovens, laminate, and combinations thereof that stretch when put under tensile force. A substrate is considered stretchable if it has a % Elongation measurement in the Machine Direction of greater than 8% as measured by the % Elongation test defined in the Test Methods section herein.

As used herein, the phrase "tissue-towel substrate" refers to products comprising tissue or paper towel technology in general, including but not limited to: conventionally felt-pressed tissue paper; pattern densified tissue paper; and high-bulk, uncompacted tissue paper. Non-limiting examples of tissue-towel products include toweling, facial tissue, bath tissue, and table napkins and the like.

As used herein, the term "registration" means the degree to which the printed image and the embossed image are disposed on the substrate in a specific relationship to one another. The relationship may be one where the printed image and the embossed image overlap, resulting in a synergistic visual interaction between the two images, or where the two images are separated from each other. A perfect registration, or registration with zero error, occurs where the printed image and the embossed image are disposed onto the substrate in exactly the specific designed relationship to each other.

It follows that the term "misregistration" means the degree to which the relative location of the disposed printed and embossed images are in the specific designed relationship to each other. Misregistration is represented by Margin of Error test results.

The term "machine direction" is a term of art used to define the dimension on the processed web of material parallel to the direction of travel that the web takes through the printing/embossing machines.

Similarly, the term "cross direction" or "cross-machine direction" refers to the dimension on the web perpendicular to the direction of travel through the machines.

The steps of the process are defined by the following.

Supplying a web of stretchable substrate 10. The substrate may be any substrate known in the art which may be embossed and printed which stretches and therefore may cause it to be more difficult to register the print image and the embossed image. Preferably, stretchable substrate refers to any material having a Machine Direction % Elongation ranging from about 8% to about 35%, more preferably ranging from about 12% to about 30%, even more preferably ranging from about 15% to about 25%. The web of stretchable substrate of this invention has a first surface 11 and a second surface 12 wherein the second surface is oppositely disposed to the first surface.

The stretchable substrate 10 may include materials which are cellulosic, noncellulosic, or a combination thereof. A preferred substrate for use in the present process comprises papermaking fibers. The papermaking fibers may be in the form of any typical paper product known in the art. Especially preferred embodiments of the stretchable substrate include absorbent tissue-towel paper substrates. The preferred absorbent tissue-towel products include single ply and multiply products and an individual ply may comprise one or more layers of papermaking materials depending on the preferred characteristics of the product. Especially preferred embodiments of the tissue-towel product substrate has a basis weight of between about 10 $g/m^2$ to 130 $g/m^2$, preferably between about 20 $g/m^2$ to 80 $g/m^2$, and most preferably between about 25 $g/m^2$ to 60 $g/m^2$. The especially preferred embodiments of the tissue-towel substrates have a density ranging from about 0.04 $g/cm^3$ to about 0.80 $g/cm^3$, preferably ranging from 0.07 $g/cm^3$ to about 0.6 $g/cm^3$, and more preferably ranging from 0.10 $g/cm^3$ to about 0.2 $g/cm^3$.

The tissue-towel product substrate preferred embodiment may comprise any tissue-towel product known in the industry. These embodiments may be made according U.S. Patents: U.S. Pat. No. 4,191,609 issued Mar. 4, 1980 to Trokhan; U.S. Pat. No. 4,300,981 issued to Carstens on Nov. 17, 1981; U.S. Pat. No. 4,514,345 issued to Johnson et al. on Apr. 30, 1985; U.S. Pat. No. 4,528,239 issued to Trokhan on Jul. 9, 1985; U.S. Pat. No. 4,529,480 issued to Trokhan on Jul. 16, 1985; U.S. Pat. No. 4,637,859 issued to Trokhan on Jan. 20, 1987; U.S. Pat. No. 5,245,025 issued to Trokhan et al. on Sep. 14, 1993; U.S. Pat. No. 5,275,700 issued to Trokhan on Jan. 4, 1994; U.S. Pat. No. 5,328,565 issued to Rasch et al. on Jul. 12, 1994; U.S. Pat. No. 5,334,289 issued to Trokhan et al. on Aug. 2, 1994; U.S. Pat. No. 5,364,504 issued to Smurkowski et al. on Nov. 15, 1995; U.S. Pat. No. 5,527,428 issued to Trokhan et al. on Jun. 18, 1996; U.S. Pat. No. 5,556,509 issued to Trokhan et al. on Sep. 17, 1996; U.S. Pat. No. 5,628,876 issued to Ayers et al. on May 13, 1997; U.S. Pat. No. 5,629,052 issued to Trokhan et al. on May 13, 1997; U.S. Pat. No. 5,637,194 issued to Ampulski et al. on Jun. 10, 1997; U.S. Pat. No. 5,411,636 issued to Hermans et al. on May 2, 1995; EP 677612 published in the name of Wendt et al. on Oct. 18, 1995.

The preferred tissue-towel substrate may be through-air-dried or conventionally dried. Optionally, it may be foreshortened by creping or by wet microcontraction. Creping and/or wet microcontraction are disclosed in commonly assigned U.S. Patents: U.S. Pat. No. 6,048,938 issued to Neal et al. on Apr. 11, 2000; U.S. Pat. No. 5,942,085 issued to Neal et al. on Aug. 24, 1999; U.S. Pat. No. 5,865,950 issued to Vinson et al. on Feb. 2, 1999; U.S. Pat. No. 4,440,597 issued to Wells et al. on Apr. 3, 1984; U.S. Pat. No. 4,191,756 issued to Sawdai on May 4, 1980; and U.S. Pat. No. 6,187,138, issued to Neal et al. on Feb. 13, 2001.

Another class of preferred substrate for use in the process of the present invention is non-woven webs comprising synthetic fibers. Examples of such substrates include but are not limited to textiles (e.g.; woven and non woven fabrics and the like), other non-woven substrates, and paperlike products comprising synthetic or multicomponent fibers. Representative examples of other preferred substrates can be found in U.S. Pat. No. 4,629,643 issued to Curro et al. on Dec. 16, 1986; U.S. Pat. No. 4,609,518 issued to Curro et al. on Sep. 2, 1986; European Patent Application EP A 112 654 filed in the name of Haq; U.S. patent application Ser. No.

2004/0154768 published on Aug. 12, 2004 in the name of Trokhan et al.; U.S. patent application Ser. No. 2004/0154767, published on Aug. 12, 2004 in the name of Trokhan et al.; and U.S. patent application Ser. No. 2003/0021952 published on Jan. 30, 2003 in the name of Zink et al.

Embossing at least one of the surfaces of the web substrate with an embossed image 20. "Embossing" refers to the process of deflecting a relatively small portion of the substrate in a direction normal to its plane and impacting the deflected portion of the substrate against a relatively hard surface to permanently disrupt the structure of the substrate. Any process known in the industry for embossing continuous webs of material may be used in the process of the present invention. Generally, such process utilize a rotary process having an embossing roller.

Embossing is typically performed by one of two processes, knob-to-knob embossing or nested embossing. Knob-to-knob embossing consists of axially parallel rollers 21 and 22 juxtaposed to form a nip between the knobs of opposing rolls having a width less than the thickness of the material to be embossed. Nested embossing consists of embossment knobs of one roller 21 meshed between the embossment knobs of the other roller 22. Examples of knob-to-knob embossing and nested embossing are illustrated in the prior art by U.S. Pat. No. 3,414,459 issued Dec. 3, 1968 to Wells and commonly assigned; U.S. Pat. No. 3,547,723 issued Dec. 15, 1970 to Gresham; U.S. Pat. No. 3,556,907 issued Jan. 19, 1971 to Nystrand; U.S. Pat. No. 3,708,366 issued Jan. 2, 1973 to Donnelly; U.S. Pat. No. 3,738,905 issued Jun. 12, 1973 to Thomas; U.S. Pat. No. 3,867,225 issued Feb. 18, 1975 to Nystrand and U.S. Pat. No. 4,483,728 issued Nov. 20, 1984 to Bauernfeind; U.S. Pat. No. U.S. Pat. No. 5,468,323 issued Nov. 21, 1995 to McNeil; and U.S. Pat. No. 6,277,466B1 issued Aug. 21, 2001 to McNeil et al.

The embossed image 20 comprise any perceptible pattern. The pattern may comprise geometric figures, linework, representations of objects, word, general background areas, and the like.

Printing a printed image 30 onto at least one surface of the web substrate. Printing processes suitable for this invention may be any rotary printing application know in the industry. These include, but are not limited to: lithography, letterpress, gravure, screen printing, intaglio and preferably flexography. Likewise, combinations and variations thereof are considered to be within the scope of the present invention. In general, the rotary printing process comprises a printing roller 31 and a counterpressure roller 32.

The printed image 30 may comprise any fluid capable of being printed onto the substrate 10. These fluids include, but are not limited to adhesives, dyes, and printing inks. A single fluid image or multi-fluid image may be applied to the substrate. Preferably, the printed image comprises one or more inks applied to the substrate. Devices suitable for applying an image onto the preferred substrate of absorbent tissue-towel paper in accordance with the present invention are described in commonly assigned U.S. Pat. No. 5,213,037 issued to Leopardi, II on May 25, 1993; U.S. Pat. No. 5,255,603 issued to Sonneville et al. issued on Oct. 26, 1993; and U.S. Pat. No. 6,096,412 issued to McFarland et al. on Aug. 1, 2000.

The printed image 30 produced on the paper can be line work, halftoning, a process print, or a combination of these. As used herein, "process print" refers to a halftone color print created by the color separation process whereby an image composed of two or more transparent inks is broken down into halftone dots which can be recombined to produce the complete range of colors of the original image.

Measuring angular location of one emboss roller 22 and translating that location into a digital signal 29. Any method 24 known in the industry for determining the angular location of a roller and translating that location into a digital signal may be used in the process of the present invention. One preferred method 24 of translating the angular location of a roller into a digital signal 29 is represented by the method shown on the slave/emboss roller 21 in FIG. 1. This preferred method provides a mechanical connection 25 from the shaft of the emboss roller to a resolver 26 which translates a mechanical signal to the digital signal 29. Any typical mechanical connection 25 may be used. A preferred mechanical connection 25 utilizes a pulley connecting shaft 27 of the emboss roller 22 to the resolver 26. Preferably the resolver 26 creates a signal of 4096 counts per scan. This method of translating angular position to a digital signal could be used on the print roller as well.

Measuring the angular location of one printing roller 31 and translating that angular location into a digital signal 39. Another preferred method of translating angular location, and therefore one that could be used on either of the printing or embossing systems, is shown on the master/print roller 31 in FIG. 1. This preferred method is to provide a proximity switch 35 which senses a flag or other marker 37 somewhere on the print roller 31 or its shaft 36. The proximity switch 35 creates a digital signal 39 for each revolution.

Manually zeroing the print/emboss registration. Either the emboss roller 22 or the print roller 31 is selected to be the master roller in the control program. The non-selected roller is then the slave roll. The process of the present invention can be operated with either roller being designated the master roller. The printing/embossing systems are "zeroed" by manually correcting the angular location of either the emboss roller 22, the print roller 31 or both based on a visual determination of the registration on the produced product. The manual correction may be a physical adjustment made by hand on the machine, or it may be an electronic adjustment sent from the operating panel to the drive motor of the roll. Therefore, the manual zeroing may be made either while the machines are running or when they are stopped.

Automatically controlling the print and emboss rolls 31 and 22 to maintain registration using a slave drive control program. The slave drive control program comprises the steps of 1) comparing the digital signal 29 from the emboss roller 22 and the digital signal 39 from the print roller 31, and 2) correct the angular location and angular speed of the slave drive motor 42 of the slave roller 22 by sending a correcting signal 41 from the slave drive 40 to the slave motor 42. One preferred embodiment of the process comprises the use of a drive integration software program, which scans the signals 29 and 39 from each of the emboss and print rolls 22 and 31 requestfully at a frequency of 4 scans per second. The software program then determines the degree of offset, (i.e. lack of registration) between the two rolls as compared to the 4096 counts per scan from the emboss roll. The drive integration software then sends a correction signal 41 to the slave drive motor 42 on the designated slave roller 22 to eliminate the offset in the rolls and thereby return the process to registration.

Test Methods

Basis Weight Method:

"Basis Weight" as used herein is the weight per unit area of a sample reported in lbs/3000 $ft^2$ or $g/m^2$. Basis weight is measured by preparing one or more samples of a certain area ($m^2$) and weighing the sample(s) of a fibrous structure according to the present invention and/or a paper product comprising such fibrous structure on a top loading balance with a minimum resolution of 0.01 g. The balance is protected from air drafts and other disturbances using a draft shield. Weights are recorded when the readings on the balance become constant. The average weight (g) is calculated and the average area of the samples ($m^2$). The basis weight ($g/m^2$) is calculated by dividing the average weight (g) by the average area of the samples ($m^2$).

Density Method:

The density, as that term is used herein, of a fibrous structure in accordance with the present invention and/or a sanitary tissue product comprising a fibrous structure in accordance with the present invention, is the average ("apparent") density calculated. The density of tissue paper, as that term is used herein, is the average density calculated as the basis weight of that paper divided by the caliper, with the appropriate unit conversions incorporated therein. Caliper of the tissue paper, as used herein, is the thickness of the paper when subjected to a compressive load of 95 g/in The density of tissue paper, as that term is used herein, is the average density calculated as the basis weight of that paper divided by the caliper, with the appropriate unit conversions incorporated therein. Caliper of the tissue paper, as used herein, is the thickness of the paper when subjected to a compressive load of 95 g/in.sup.2 (15.5 g/cm.sup.2). The density of tissue paper, as that term is used herein, is the average density calculated as the basis weight of that paper divided by the caliper, with the appropriate unit conversions incorporated therein. Caliper of the tissue paper, as used herein, is the thickness of the paper when subjected to a compressive load of 95 g/in.sup.2 (15.5 g/cm.sup.2). The density of tissue paper, as that term is used herein, is the average density calculated as the basis weight of that paper divided by the caliper, with the appropriate unit conversions incorporated therein. Caliper of the tissue paper, as used herein, is the thickness of the paper when subjected to a compressive load of 95 g/in.sup.2 (15.5 g/cm.sup.2). The density of tissue paper, as that term is used herein, is the average density calculated as the basis weight of that paper divided by the caliper, with the appropriate unit conversions incorporated therein. Caliper of the tissue paper, as used herein, is the thickness of the paper when subjected to a compressive load of 95 g/in.sup.2 (15.5 g/cm.sup.2). The density of tissue paper, as that term is used herein, is the average density calculated as the basis weight of that paper divided by the caliper, with the appropriate unit conversions incorporated therein. Caliper of the tissue paper, as used herein, is the thickness of the paper when subjected to a compressive load of 95 g/in.sup.2 (15.5 g/cm.sup.2). as the basis weight of that fibrous structure or sanitary tissue product divided by the caliper, with appropriate unit conversions. Caliper, as used herein, of a fibrous structure and/or sanitary tissue product is the thickness of the fibrous structure or sanitary tissue product comprising such fibrous structure when subjected to a compressive load of 15.5 $g/cm^2$.

% Elongation(Stretch)

Prior to tensile testing, the paper samples to be tested should be conditioned according to TAPPI Method #T4020M-88. All plastic and paper board packaging materials must be carefully removed from the paper samples prior to testing. The paper samples should be conditioned for at least 2 hours at a relative humidity of 48 to 52% and within a temperature range of 22 to 24° C. Sample preparation and all aspects of the tensile testing should also take place within the confines of the constant temperature and humidity room.

Discard any damaged product. Next, remove 5 strips of four usable units (also termed sheets) and stack one on top to the other to form a long stack with the perforations between the sheets coincident. Identify sheets 1 and 3 for machine direction tensile measurements and sheets 2 and 4 for cross direction tensile measurements. Next, cut through the perforation line using a paper cutter (JDC-1-10 or JDC-1-12 with safety shield from Thwing-Albert Instrument Co. of Philadelphia, Pa.) to make 4 separate stocks. Make sure stacks 1 and 3 are still identified for machine direction testing and stacks 2 and 4 are identified for cross direction testing.

Cut two 1 inch (2.54 cm) wide strips in the machine direction from stacks 1 and 3. Cut two 1 inch (2.54 cm) wide strips in the cross direction from stacks 2 and 4. There are now four 1 inch (2.54 cm) wide strips for machine direction tensile testing and four 1 inch (2.54 cm) wide strips for cross direction tensile testing. For these finished product samples, all eight 1 inch (2.54 cm) wide strips are five usable units (also termed sheets) thick.

For unconverted stock and/or reel samples, cut a 15 inch (38.1 cm) by 15 inch (38.1 cm) sample which is 8 plies thick from a region of interest of the sample using a paper cutter (JDC-1-10 or JDC-1-12 with safety shield from Thwing-Albert Instrument Co of Philadelphia, Pa.). Ensure one 15 inch (38.1 cm) cut runs parallel to the machine direction while the other runs parallel to the cross direction. Make sure the sample is conditioned for at least 2 hours at a relative humidity of 48 to 52% and within a temperature range of 22 to 24° C. Sample preparation and all aspects of the tensile testing should also take place within the confines of the constant temperature and humidity room.

From this preconditioned 15 inch (38.1 cm) by 15 inch (38.1 cm) sample which is 8 plies thick, cut four strips 1 inch (2.54 cm) by 7 inch (17.78 cm) with the long 7 (17.78 cm) dimension running parallel to the machine direction. Note these samples as machine direction reel or unconverted stock samples. Cut an additional four strips 1 inch (2.54 cm) by 7 inch (17.78 cm) with the long 7 (17.78 cm) dimension running parallel to the cross direction. Note these samples as cross direction reel or unconverted stock samples. Ensure all previous cuts are made using a paper cutter (JDC-1-10 or JDC-1-12 with safety shield from Thwing-Albert Instrument Co. of Philadelphia, Pa.). There are now a total of eight samples: four 1 inch (2.54 cm) by 7 inch (17.78 cm) strips which are 8 plies thick with the 7 inch (17.78 cm) dimension running parallel to the machine direction and four 1 inch (2.54 cm) by 7 inch (17.78 cm) strips which are 8 plies thick with the 7 inch (17.78 cm) dimension running parallel to the cross direction.

For the actual measurement of the tensile strength, use a Thwing-Albert Intelect II Standard Tensile Tester (Thwing-Albert Instrument Co. of Philadelphia, Pa.). Insert the flat face clamps into the unit and calibrate the tester according to the instructions given in the operation manual of the Thwing-Albert Intelect II. Set the instrument crosshead speed to 4.00 in/min (10.16 cm/min) and the 1st and 2nd gauge lengths to 2.00 inches (5.08 cm). The break sensitivity should be set to 20.0 grams and the sample width should be set to 1.00 inch (2.54 cm) and the sample thickness at 0.025 inch (0.0635 cm).

A load cell is selected such that the predicted tensile result for the sample to be tested lies between 25% and 75% of the range in use. For example, a 5000 gram load cell may be used for samples with a predicted tensile range of 1250 grams (25% of 5000 grams) and 3750 grams (75% of 5000 grams). The tensile tester can also be set up in the 10% range with the 5000 gram load cell such that samples with predicted tensiles of 125 grams to 375 grams could be tested.

Take one of the tensile strips and place one end of it in one clamp of the tensile tester. Place the other end of the paper strip in the other clamp. Make sure the long dimension of the strip is running parallel to the sides of the tensile tester. Also make sure the strips are not overhanging to the either side of the two clamps. In addition, the pressure of each of the clamps must be in full contact with the paper sample.

After inserting the paper test strip into the two clamps, the instrument tension can be monitored. If it shows a value of 5 grams or more, the sample is too taut. Conversely, if a period of 2–3 seconds passes after starting the test before any value is recorded, the tensile strip is too slack.

Start the tensile tester as described in the tensile tester instrument manual. The test is complete after the cross-head automatically returns to its initial starting position. Read and record the tensile load in units of grams from the instrument scale or the digital panel meter to the nearest unit.

If the reset condition is not performed automatically by the instrument, perform the necessary adjustment to set the instrument clamps to their initial starting positions. Insert the next paper strip into the two clamps as described above and obtain a tensile reading in units of grams. Obtain tensile readings from all the paper test strips. It should be noted that readings should be rejected if the strip slips or breaks in or at the edge of the clamps while performing the test.

If the percentage elongation at peak (% Stretch) is desired, determine that value at the same time tensile strength is being measured. Calibrate the elongation scale and adjust any necessary controls according to the manufacturer's instructions.

For electronic tensile testers with digital panel meters read and record the value displayed in a second digital panel meter at the completion of a tensile strength test. For some electronic tensile testers this value from the second digital panel meter is percentage elongation at peak (% stretch); for others it is actual inches of elongation.

Repeat this procedure for each tensile strip tested.

Calculations: Percentage Elongation at Peak (% Stretch) —For electronic tensile testers displaying percentage elongation in the second digital panel meter:

Percentage Elongation at Peak (% Stretch)=(Sum of elongation readings) divided by the (Number of readings made).

For electronic tensile testers displaying actual units (inches or centimeters) of elongation in the second digital panel meter:

Percentage Elongation at Peak (% Stretch)=(Sum of inches or centimeters of elongation) divided by ((Gauge length in inches or centimeters) times (number of readings made))

Results are in percent. Whole number for results above 5%; report results to the nearest 0.1% below 5%.

MD Registration Margin of Error

The MD Registration Margin of Error is the three times the standard deviation in the registration measurement of consecutive repeating units from the embossing roller and the print roller.

Substrate samples for measurement of Machine Direction (MD) Registration Margin of Error must be long enough to provide at least 10 repeating units. The most convenient way transport and handle sample of this length is in rolls, also known as logs, of finished product. Prior to print-to-emboss registration testing, the substrate samples to be tested should be conditioned according to TAPPI Method #T4020M-88. All plastic and paper board packaging materials must be carefully removed from the substrate samples prior to testing. The substrate samples should be conditioned for at least 2 hours at a relative humidity of 48 to 52% and within a temperature range of 22° to 24° C. Sample preparation and all aspects of the testing should also take place within the confines of the constant temperature and humidity room.

The following discussion refers to FIGS. 2, 3*a*, 3*b*, and 4. On one table 100 large enough to hold roller assembly 101, comprising Roller A 102 with a cantilevered support bracket 105 and a hand crank 104. The length of Roller A 102 is approximately equal to the width (cross-machine direction) of the web 500 to be measured and Roller A 102 is anchored at one end of the table 100, in the center of the width of the table, such that it extends perpendicular to the length of table 100. On a 60 inch (153.40 cm) long (or longer) smooth, white-topped table 200, anchor a second roller assembly 201, comprising Roller B 202, with a cantilevered support bracket 205 and a hand crank 204. Again, Roller B 202 should be anchored at one end of table 200, in the center of the width of the table, such that it is perpendicular to the length of table 200. Place the two tables 100 and 200 end to end with Rollers A and B 102 and 202 with a 30 cm gap 210 between the tables. Establish parallel relationship between two rollers 102 and 202.

If the sample log has been received with the print side rolled to the outside of the log, the sample needs to be carefully rewound to be print side inside. This rewinding must be done carefully to avoid stretching the samples. If the sample has been received print side inside, no rewinding is necessary. Slide the finished product log 501 onto Roller A 102 with the roll orientation unwinding with the printed side 504 down against the table. Label the tail sheet on the outside of the log with the word "tail". To roller B 202, attach an empty core whose length is approximately equal to the width of the web 500 to be measured. Unroll an 80 inch (203 cm) span of the finished product log 501 towards roller B 202. To the core on roller B, attach the tail of the log with tape to the blank core on roller B 202. Take the web 500 over the top of the roller B 202, not under, so that the resulting rewound log 502 has the printing on the inside.

Using the crank handle on roller B 204, rewind the entire log—so now the original core sheet is on the outside of the log. The resulting rewound log 502 should be white/unprinted on the outside. Gently ease the last sheet away from the original core so the substrate does not stretch. Label "Core" on the original core sheet.

Remove the rewound log 502 from roller B 202. Place the rewound log on roller A 102. Place the empty core on roller B 202. Pull a full span of printed and embossed substrate sample from Roller A 102 to Roller B 202. With the first span of substrate, print and emboss side up, place a dead weight 203, whose length is approximately equal to the width of the web to be measured, on the sheet by roller B 202. Allow approximately 24 inches (60.96 cm) of web to drape 505 in the gap 210 between the two tables. Place second dead weight 103 by roller A 102 to prevent the log 502 from unwinding. Provide constant web tension by placing a 234 gram cylinder 506, whose length is approximately equal to the width of the web to be measured, on the unsupported span of web 505.

In most rotary style embossing operations and printing operations, both the emboss image 20 and print image 30 will be repeatable patterns in the machine direction (MD) matching the circumference of their embossing cylinder and printing cylinder respectively. With that, establish any repeatable unit of emboss and any repeatable unit of print. For measurement purposes only, assume phasing alignment on the first length of web is established between the print and emboss images. That is, assume that the registration on the first sheet measured is the target registration desired by the designer.

Identify and mark the beginning 521 of the emboss image repeat unit 520. Identify and mark the beginning of the identical emboss image in the second repeat unit 522. Also label the consecutive repeat unit number, beginning with "1". Repeat this process until the entire exposed span is marked similarly. Identify and mark the beginning 531 of the print image repeat unit 530. Identify and mark the beginning of the identical print image in the second repeat unit 532. Also label the consecutive repeat unit number, beginning with "1". Repeat this process until the entire exposed span is marked similarly.

Choose a scale 207, graduated in 1⁄32 inch increments (or 1 mm increments), that is longer than the maximum machine direction span between the emboss image and the print image repeatable units. Use this scale to measure the machine direction distance between the beginning of emboss unit 1 521 and the beginning of print unit 1 531. Measurements are taken and recorded to the nearest 1⁄32 inch (or 1 mm). This is termed "print to emboss MD registration offset". Also record the corresponding repeat unit number. Next, measure and record the MD distance between the beginning of emboss unit 2 522 and the beginning of print unit 2 532. Repeat this process until the entire exposed span is measured similarly.

Remove and set aside the scale 207, 234 g cylinder 506 and both dead weights 103 and 203. Take the "core" end of the web 500 under roller B 202 so that the resulting rewound log 507 will have the printing on the inside. Tape the "core" end of the web to the empty core. Wind up the first span of web onto roller B 202. Keep the last marking exposed on the table. Replace the 234 g cylinder 506 to the newly unsupported span 505. Replace both dead weights 103 and 203 to each end of the web. Measure "print to emboss MD registration offset." Repeat the process and measurements on each subsequent span. When the original tail sheet is exposed, every repeatable emboss unit and print unit will be measured sequentially within a single log.

If measuring sequentially produced logs of finished product, carefully align and attach the tail sheet of log 1 to the core sheet of log 2 with clear wide tape. The "log to log splice" allows the resulting web to be treated as a continuous web span. Any repeat unit distance measurements that falls over this log-to-log splice is counted as a unit but withdrawn from the offset variation calculations.

Calculations

Standard Deviation:

$$\sigma=\sqrt{(\Sigma(x-x\text{bar})^2/\,n-1)}$$

where;

σ=standard deviation x=individual measurement xbar=average of the entire population of individual measurements n=number of individual measurements or population size therefore;

$$3\sigma=3^*\sqrt{(\Sigma(x-x\text{bar})^2/n-1)}$$

The "MD Registration Margin of Error" equals this 3σ value.

All documents cited in the Detailed Description of the Invention are, are, in relevant part, incorporated herein by reference; the citation of any document is not to be construed as an admission that it is prior art with respect to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process for making continuous stretchable substrate products comprising the steps of:

a) supplying a web of stretchable substrate having a first surface and a second surface;

b) embossing at least one of the surfaces of the web substrate with an embossed image using at least one embossing roller having an angular location;

c) printing at least one of the surfaces of the web substrate with a printed image using at least one printing roller having an angular location; wherein the embossed image and the printed image are disposed onto the substrate relative to each other such that a print/emboss registration is created;

d) measuring the angular location of one embossing roller and translating that location into a digital signal;

e) measuring the angular location of one printing roller and translating that location into a digital signal;

f) manually zeroing the print/emboss registration; and g) automatically controlling the print and emboss rolls to maintain registration using a control program that comprises the steps of:

i) comparing the digital signal from the embossing roller and the digital signal from the printing roller; and ii) correcting the angular location and angular speed of either the embossing roller or the printing roller.

2. The process according to claim 1 wherein the control program maintains registration by correcting the angular location and angular speed of the embossing roller.

3. The process according to claim 1 wherein the control program maintains registration by correcting the angular location and angular speed of the printing roller.

4. The process according to claim 1 wherein both the embossed image and the printed image are printed on the same surface of the web of substrate.

5. The process according to claim 1 where in the stretchable substrate comprises a tissue-towel substrate.

* * * * *